Jan. 4, 1927.                                                1,613,273
J. T. HAMILTON
VEHICLE TOP
Filed Feb. 14, 1925                          2 Sheets-Sheet 1

INVENTOR.
J. TELFORD HAMILTON.
BY
ATTORNEYS.

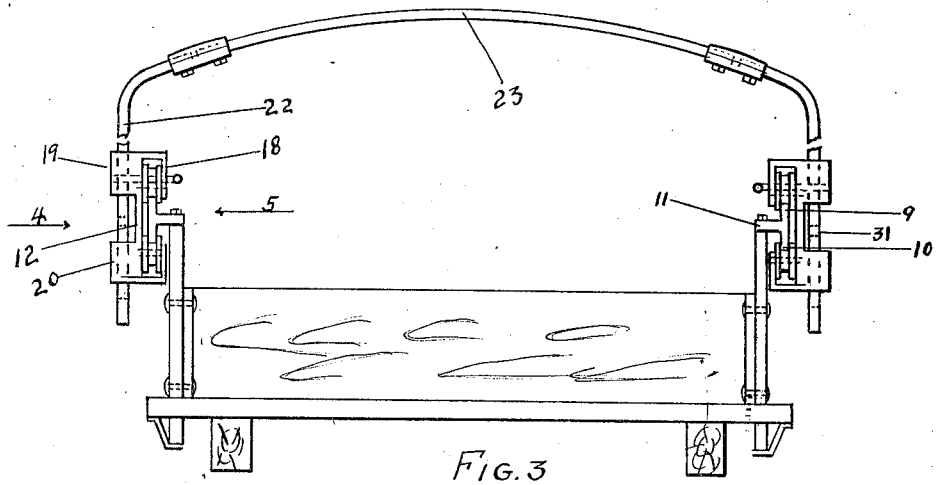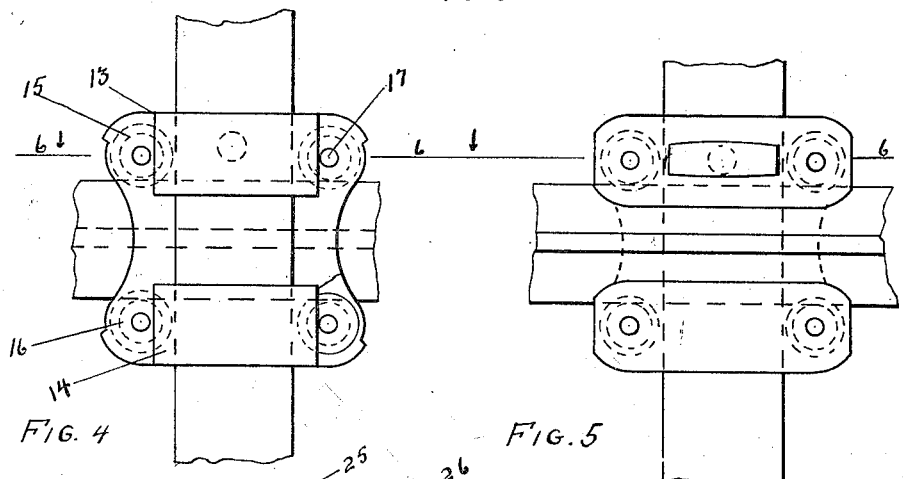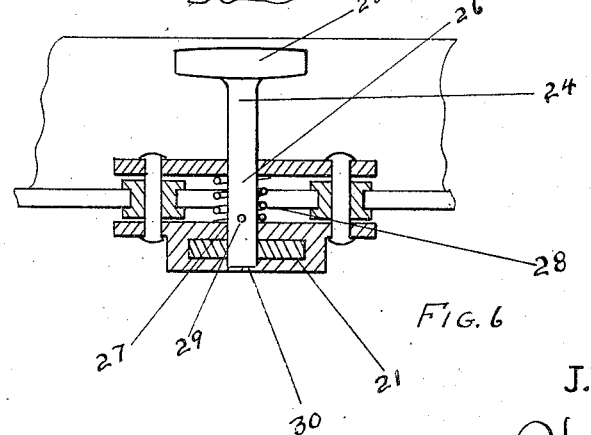

Patented Jan. 4, 1927.

1,613,273

UNITED STATES PATENT OFFICE.

JAMES TELFORD HAMILTON, OF BERKELEY, CALIFORNIA, ASSIGNOR TO PACIFIC NATIONAL CO., INC., OF SAN FRANCISCO, CALIFORNIA, A CORPORATION OF CALIFORNIA.

VEHICLE TOP.

Application filed February 14, 1925. Serial No. 9,131.

My invention relates to vehicle tops or covers of the canopy type, particularly adapted for use with trucks. The device comprises a series of bows or hoops, which may be slid lengthwise of the truck to fold or extend the cover, the latter being preferably of canvas or other flexible material.

An object of my invention is to allow ready loading and unloading of the truck by moving the cover to one end so that a load may be handled by a crane lifted vertically on or off the truck, and while being transported the cover is quickly drawn over the freight.

In the specific construction illustrated a track is secured at each side of the truck, and carries a series of small carriages, each carriage forming the mounting for a bow or hoop. The carriages have an upper and a lower set of wheels engaging the top and bottom of the track so that the hoops may readily be moved lengthwise of the rail. The bows pass through apertures in the carriage and are secured in the proper position by pins passing through apertures therein. The tracks are supported by a special frame, or they may be secured to the side of a truck body.

My invention will be more clearly understood from the following specification and drawings, in which:

Figure 3 is a cross section through Figure 1 on the line 3—3 in the direction of the arrow, showing the rails, the carriages mounted thereon, and bows supported by the carriages.

Figure 4 is an outside view of one of the carriages in the direction of the arrow 4 in Figure 3.

Figure 5 is an inside view of one of the carriages in the direction of the arrow 5 of Figure 3.

Figure 6 is a cross section on the line 6—6 of Figs. 4 and 5, in the direction of the arrows, illustrating the locking pin securing the bows at desired elevation.

Figure 1:
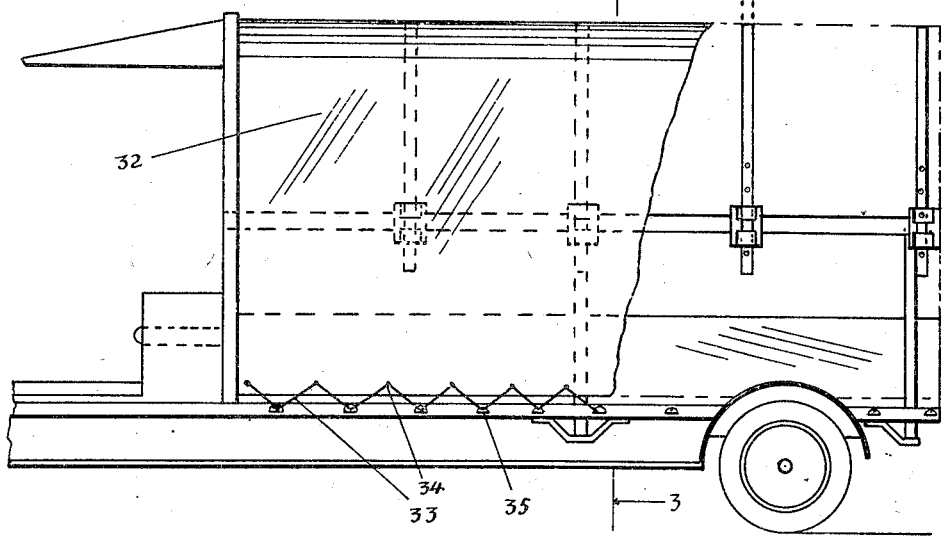
Figure 1 is a side view of a truck with the top or cover extended, illustrating part of the structure in section.
Figure 2:
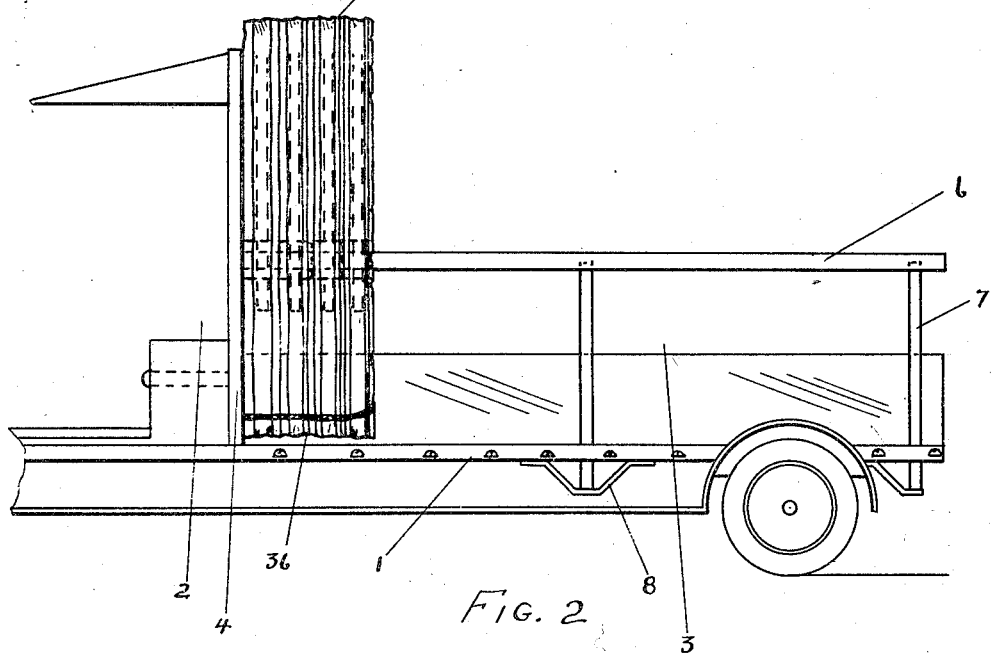
Figure 2 is a side view similar to Figure 1, with the top or cover folded, that is with the bows run close together and the covering secured in closed position.

In the drawings, referring particularly to Figures 1 and 2, a truck body 1 has a driver's compartment 2, a freight box 3, and a partition 4 therebetween. The top 5 is carried on rails 6, which are shown supported by stanchions 7 supported by the braces 8 from the body of the truck 1. The rails 6 have upper and lower flanges 9 and 10, and a web 11, which is secured to the stanchions 7 by bolts or the like. The rails are preferably also secured to the partition 4 at their front end, and are left clear at the rear end so that the top may be readily removed.

The carriages for supporting the top are constructed as follows, having reference particularly to Figures 3 to 6. A substantial web 12 supports upper and lower wheel housings 13 and 14, in which are mounted upper and lower wheels 15 and 16 on journals 17, the journals having a bearing on one side in the web 12 and on the inner side a flange 18. The upper and lower wheels are positioned to make a firm engagement with the upper and lower flanges of the rail.

The webs 12 have formed integral therewith, or connected thereto, upper and lower housings 19 and 20 with vertical sockets 21 extending there-through. In these sockets are mounted the lower ends 22 of the bows or hoops 23. Adjusting pins 24, preferably having a hand grip 25 are mounted in apertures 26 through the web 12 and 27 through the upper housing 19. A coil spring 28 bears against the web and against a pin 29 through the adjusting pin 24, thus normally tending to thrust the adjusting pin 24 outward in contact with the depression 30 in the outer part of the upper housing 19. There are a series of apertures 31 in the ends 22 of the bows through which the pin 24 engages to hold the bows and the top at the desired elevation.

The canvas cover is indicated by the numeral 32 and has a lacing 33 at the bottom passing through eyes 34 of the canvas and engaging hooks 35 on the body, as shown in Figures 1 and 2. When the top is folded the canvas is bunched together and secured by a strap 36.

My invention may be considerably modified to suit special constructions, and may be adapted to small railway trucks, other types of vehicles, or vessels. The whole top with the bows and carriages may easily be removed by letting the carriages off the rail 6.

Having described my invention, I claim:

A carriage for a rail of the character described, comprising a web having flanges extending from the upper and lower edges thereof, the flanges being turned toward one another, two sets of wheels supported between the flanges and the web and adapted to engage a rail on opposite edges thereof, blocks projecting from the opposite face of the web, the blocks being perforated to allow a rod to be passed therethrough, a pin slidable in registering perforations in one of the flanges, the web and the rod and having a pin extending therethrough adapted to bear against the web for limiting the depth of penetration of the first pin and a spring encircling the first pin and disposed between the second pin and the said flange so as to allow the rod to be manually retracted while urging the same forwardly.

In testimony whereof I affix my signature.

J. TELFORD HAMILTON.